United States Patent
Xiao et al.

(10) Patent No.: US 10,267,295 B2
(45) Date of Patent: Apr. 23, 2019

(54) METHOD AND APPARATUS FOR SOLAR POWER GENERATION THROUGH GAS VOLUMETRIC HEAT ABSORPTION BASED ON CHARACTERISTIC ABSORPTION SPECTRUM

(71) Applicant: Zhejiang University, Hangzhou (CN)

(72) Inventors: Gang Xiao, Hangzhou (CN); Min Qiu, Hangzhou (CN); Mingjiang Ni, Hangzhou (CN); Qiang Li, Hangzhou (CN); Wen Yang, Hangzhou (CN); Zhongyang Luo, Hangzhou (CN); Kefa Cen, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 0 days.

(21) Appl. No.: 15/617,608

(22) Filed: Jun. 8, 2017

(65) Prior Publication Data

US 2018/0038353 A1 Feb. 8, 2018

(30) Foreign Application Priority Data

Aug. 8, 2016 (CN) .......................... 2016 1 0643482

(51) Int. Cl.
*F03G 6/04* (2006.01)
*F24S 70/12* (2018.01)
(Continued)

(52) U.S. Cl.
CPC ................ *F03G 6/04* (2013.01); *F02C 1/05* (2013.01); *F03G 6/064* (2013.01); *F24S 70/12* (2018.05);
(Continued)

(58) Field of Classification Search
CPC .. F03G 6/04; F03G 6/064; F24J 2/4649; F24J 2/481; F24J 2002/4601; F02C 1/05
See application file for complete search history.

(56) References Cited

U.S. PATENT DOCUMENTS

| 1,661,473 A | * | 3/1928 | Goddard | ................. F24S 23/74 |
| | | | | 126/685 |
| 4,051,835 A | * | 10/1977 | Hinson-Rider | ......... F24S 10/70 |
| | | | | 126/674 |

(Continued)

FOREIGN PATENT DOCUMENTS

| CN | 101761461 A | 6/2010 |
| CN | 202813817 U | * 3/2013 |

(Continued)

OTHER PUBLICATIONS

English Translation CN 2028 13817 U.*

(Continued)

*Primary Examiner* — Mark A Laurenzi
*Assistant Examiner* — Shafiq Mian
(74) *Attorney, Agent, or Firm* — David D. Brush; Westman, Champlin & Koehler, P.A.

(57) ABSTRACT

The present application discloses a method and an apparatus for solar power generation through gas volumetric heat absorption based on characteristic absorption spectrum. A radiation energy conversion device absorbs concentrated solar radiation and converts radiation energy into thermal energy; the thermal energy is transferred to the other side of the radiation energy conversion device and then is converted into radiation energy; and the energy is transferred in a receiver cavity. The working gas from the outlet of a recuperator flows into the receiver cavity and absorbs the radiation energy. The heated working gas with high temperature flows into a turbine, doing shaft work through expansion. The expanded working gas flows through the
(Continued)

recuperator to exchange heat. The working gas flows into a cooler, a compressor and the recuperator in sequence, and then flows into a receiver cavity to be heated volumetrically, completing a thermal power cycle.

11 Claims, 2 Drawing Sheets

(51) Int. Cl.
    *F24S 80/20*     (2018.01)
    *F02C 1/05*     (2006.01)
    *F03G 6/06*     (2006.01)
    *F24S 90/00*     (2018.01)
    *F24S 80/00*     (2018.01)

(52) U.S. Cl.
    CPC ............... *F24S 80/20* (2018.05); *F24S 90/00* (2018.05); *F24S 2080/03* (2018.05); *Y02E 10/46* (2013.01)

(56) References Cited

U.S. PATENT DOCUMENTS

| | | | | |
|---|---|---|---|---|
| 4,298,389 | A * | 11/1981 | Johnson | C03C 3/091 501/77 |
| 7,607,428 | B2 * | 10/2009 | Riffelmann | F24S 20/20 126/684 |
| 8,087,245 | B2 * | 1/2012 | Quero | F03G 6/065 60/641.15 |
| 2004/0031517 | A1 * | 2/2004 | Bareis | F24S 23/71 136/246 |
| 2004/0055631 | A1 * | 3/2004 | Szymocha | F24S 10/40 136/243 |
| 2004/0214001 | A1 * | 10/2004 | Oldenburg | A61K 41/0042 428/404 |
| 2006/0080960 | A1 * | 4/2006 | Rajendran | F01K 25/065 60/649 |
| 2007/0223096 | A1 * | 9/2007 | O'Connor | G02B 5/10 359/584 |
| 2007/0291384 | A1 * | 12/2007 | Wang | G02B 5/0841 359/883 |
| 2010/0176602 | A1 * | 7/2010 | Shinnar | F03G 6/04 290/1 A |
| 2011/0277471 | A1 * | 11/2011 | Shinnar | F03G 6/04 60/641.14 |
| 2012/0111006 | A1 * | 5/2012 | Varga | F24J 2/07 60/641.15 |
| 2013/0113221 | A1 * | 5/2013 | Held | F01K 25/10 290/1 R |
| 2013/0160817 | A1 * | 6/2013 | Lin | H01L 31/052 136/246 |
| 2013/0220307 | A1 * | 8/2013 | Stettenheim | F03G 6/06 126/652 |
| 2016/0049897 | A1 | 2/2016 | Noda et al. | |

FOREIGN PATENT DOCUMENTS

| | | | |
|---|---|---|---|
| JP | 02068454 | A * | 3/1990 |
| JP | H0268454 | A | 3/1990 |
| JP | 2010002077 | A * | 1/2010 |
| JP | 5152503 | B2 | 2/2013 |
| JP | 2016195492 | A | 11/2016 |
| WO | 2014136671 | A1 | 9/2014 |
| WO | 2016210339 | A1 | 12/2016 |

OTHER PUBLICATIONS

English Translation JP 2010002077 A.*
English Translation 02068454 A.*
Japanese Office Action and partial English translation dated Sep. 5, 2017 for Japanese patent Application No. JP2017-152839.
De Zoysa, Menaka, et al., Conversion of broadband to narrowband thermal emission through energy recycling, Nature Photonics, Aug. 2012, vol. 6, p. 535-539.
English translation of the Notice of Allowance dated Dec. 22, 2017 for corresponding JP Application No. 2017-152839.
Werbe-fuentes J, Moody M, Korol O, et al. Carbon Dioxide Absorption in the Near Infrared [J]. New York, USA, 2005.
Tang Z, Liu J, Xia Y, et al. Characteristic absorption peak of the human blood measured with differential photoacoustic spectroscopy [J]. Chinese Science Bulletin, 2002, 47(24): 2029.
English translation of the First Office Action of the State Intellectual Property Office of China, dated May 2, 2018 for corresponding Chinese Application No. 201610643482.1.

* cited by examiner

METHOD AND APPARATUS FOR SOLAR POWER GENERATION THROUGH GAS VOLUMETRIC HEAT ABSORPTION BASED ON CHARACTERISTIC ABSORPTION SPECTRUM

CROSS-REFERENCE TO RELATED APPLICATIONS

This application claims priority to and the benefit of Chinese Patent Application No. 201610643482.1, filed on Aug. 8, 2016, entitled "Method and Apparatus for Solar Power Generation through Gas Volumetric Heat Absorption Based on Characteristic Absorption Spectrum", which is incorporated by reference herein in its entirety.

FIELD OF THE INVENTION

The present application relates to the technical field of solar thermal power generation, in particular to a method and an apparatus for solar power generation through gas volumetric heat absorption.

DESCRIPTION OF THE PRIOR ART

Reducing the use of fossil fuels and vigorously developing and utilizing renewable energy are important measures to solve energy crisis and environmental pollution. Solar energy is ubiquitous, abundant, economical and environment-friendly, and the solar thermal power generation technology is one of the research hotspots and focuses of the current solar energy utilization technologies. The basic principle of the solar thermal power generation technology is to use parabolic reflectors to concentrate solar radiation into a solar receiver in which a heat-absorbing medium is heated, and the working medium of a power generation system is heated by a heat exchange system, then the working medium drives the turbine to do shaft work and the generator to generate power. According to different kinds of concentrators, solar thermal power generation systems can be categorized as four kinds, i.e., trough systems, tower systems, dish systems and linear Fresnel systems. All of the four kinds of power generation systems are composed of four basic subsystems, namely, a concentrating system, a heat collection system, a heat storage system and a power generation system.

Solar receivers are the core components of solar thermal power generation systems and have different structures and types in different applications. According to the heat absorbing ways of the working medium, the solar receivers can be mainly categorized as two kinds: indirect solar receivers and direct solar receivers. The indirect solar receiver is characterized by transferring heat through walls. The outside of the walls are heated by the concentrated solar radiation, and the heat absorbing medium is heated by the walls. The indirect receivers are very common receivers. For example, exposed tubular receiver and cavity receivers are both indirect receivers. The advantages of this kind of solar receiver are flexible for multi-media, simple structure and mature technology. However, the drawbacks of the indirect receivers are large heat absorbing area because of heat exchange pipes for heat exchange, low efficiency and high cost. The direct receivers generally comprise a radiation absorbing medium, and air is usually used as heat transfer medium. The radiation absorbing medium with a porous structure absorbs solar radiation while air is forced to flow through the heat absorbing body. The air is heated after convective heat exchange with the radiation absorbing medium. This kind of solar receiver requires that the radiation absorbing medium has strong heat absorption capacity, excellent thermal conductivity and permeability, strong heat resistance and relatively large specific surface area. This kind of solar receiver can achieve high outlet temperature of air, but with complex structure and great technical difficulty.

SUMMARY OF THE INVENTION

The present application provides a method and an apparatus for solar power generation through gas volumetric heat absorption based on characteristic absorption spectrum in order to overcome the drawbacks of current solar receivers such as large heat absorbing area and low heat absorbing efficiency. The methods of surface heat absorption and dividing-wall-type heat exchange used in the current solar receivers lie in that the heat absorbing surface absorbs the incident solar radiation; thus the temperature of the heat absorbing surface is increased; heat is transferred to the heat absorbing medium through a wall surface. The gas volumetric heat absorption method provided by the present application is that a radiation energy conversion device absorbs concentrated solar radiation and emits radiation energy which is distributed in the vicinity of the characteristic absorption peak of the working gas, and the working gas directly absorbs radiation energy volumetrically to complete the heat transfer process. With the gas volumetric heat absorption method provided by the present application, the heat absorbing and heat exchange areas of the solar receiver can be substantially reduced, simplifying the solar receiver and leading to high efficiency and low cost.

The particular technical solution of the present application is as follows:

A method for solar power generation through gas volumetric heat absorption based on characteristic absorption spectrum is as follows: a radiation energy conversion device absorbs concentrated solar radiation on one side and converts radiation energy into thermal energy; the thermal energy is transferred to the other side of the radiation energy conversion device and then is converted into radiation energy which is distributed in the vicinity of a characteristic absorption peak of the working gas; and the energy is transferred by radiation in a receiver cavity for heat exchange; the working gas flowing through a recuperator transfers the heat while the temperature of the working gas is increased; then the working gas flows into a solar receiver, absorbing radiation energy volumetrically, which is emitted from the radiation energy conversion device in the receiver cavity, and thus the temperature of the working gas is increased further quickly; the heated working gas does shaft work through expansion for a power generation cycle.

The radiation energy conversion device with a three-layer stacked structure comprises a radiation receiver, an intermediate layer and a radiation emitter, and the material of the radiation energy conversion device is metal or semiconductor. The radiation receiver and the radiation emitter consist of a plurality of nanoscale structures, for example, a kind of radiation receiver or radiation emitter can be formed when metal nanorods of a silver material are arranged at a certain interval and angle and stacked in multiple layers. When the incident solar radiation is concentrated on the surface of the solar receiver, the solar receiver can efficiently absorb the solar radiation via the internal nanostructures and convert radiation energy into thermal energy, increasing the temperature of the solar receiver; the material of the intermediate layer is metal or semiconductor with good thermal conductivity, absorbing thermal energy from the radiation receiver, thus the temperature of the intermediate layer increases while the temperature of the radiation receiver decreases; and the radiation emitter is heated up when absorbing the thermal energy from the intermediate layer, and emits a radiation wave via the internal nanostructures. When the radiation energy conversion device reaches an energy balance state, the temperature of the device reaches a stable value. The principles of radiation receiver and radiation emitter are similar, where the radiation wave absorption and radiation are both achieved via the nanostructures within the radiation receiver or emitter. The radiation receiver not only absorbs the solar radiation but also emits the radiation wave and the radiation emitter not only emits radiation but also absorbs the radiation wave, however, the respective ratio of absorption to radiation is different. The radiation emitter is the core component of the radiation energy conversion device, and plays the role of emitting the radiation energy which is distributed in the vicinity of the characteristic absorption peak of the working gas. The radiation energy in essence is a radiation wave with different intensities and different wavelengths, and the spectrum of the radiation energy has a center wavelength and a spectral line width. Wherein, the value of the center wavelength depends mainly on the temperature of the radiation emitter, and the spectral line width depends mainly on the material and microstructure of the radiation emitter, while the intensity of the radiation energy depends mainly on the energy of the incident solar radiation. The radiation energy conversion device realizes an energy transfer and conversion process where the solar radiation energy is converted into thermal energy and then the thermal energy is transferred, converted into the radiation energy.

The radiation energy which is distributed in the vicinity of the characteristic absorption peak of the working gas is the radiation energy having a center wavelength of a radiation spectrum the same as the center wavelength of the characteristic absorption peak of the working gas and having a spectral line width of a radiation spectrum smaller than the spectral line width of the characteristic absorption peak of the working gas. Each working gas has a characteristic absorption spectrum with multiple characteristic absorption peaks, with each absorption peak having a certain spectral line width. In the vicinity of the characteristic absorption peaks, the radiation absorption intensity and efficiency of the working gas are relatively high. The spectral line shape of the radiation energy emitted by the radiation emitter is similar to that of the characteristic absorption peaks of the working gas, though the center wavelength and the spectral line width may not be the same. The center wavelength determines the center value of the wavelength distribution of the spectrum and the spectral line width determines the concentration degree of the energy distribution of the spectrum. One principle of designing the radiation emitter is as follows: the center wavelength of the emitted radiation energy is the same as that of a certain characteristic absorption peak of the working gas, and the spectral line width of the radiation energy is smaller (as small as possible) than that of a certain characteristic absorption peak of the working gas. In this situation, more radiation energy is concentrated in the relatively narrow wavelength range in the vicinity of the characteristic absorption peak of the working gas, and the absorption efficiency of the working gas for the radiation energy is relatively high. However, the smaller the spectral line width of the radiation energy, the more difficult the design of the radiation emitter is. In general, the design of the radiation emitter is based on a certain characteristic absorption peak of the working gas, and the spectral line width of the radiation energy depends mainly on the characteristic absorption spectrum of the working gas, and the material and internal structure of the radiation emitter.

The heat absorbing medium of the solar receiver includes carbon dioxide, water vapor or organic matters such as hexafluoropropane, butane and butene. Current solar receivers are based on the methods of surface heat absorption and dividing-wall-type heat exchange, and the heat absorbing medium are mainly air, water vapor and molten salt; while the heat absorbing medium of the solar receivers based on the gas volumetric heat absorption method not only can be inorganic working gases such as carbon dioxide, ammonia, water vapor, but also can be organic working gases such as pentafluoropropane, hexafluoropropane, butane, butene and so on. Each working gas has the respective characteristic absorption spectrum and has a plurality of characteristic absorption peaks. Based on a certain characteristic absorption peak, a specific radiation energy conversion device can be designed to emit the radiation energy which is distributed in the vicinity of the characteristic absorption peak of the working gas, and the working gas can efficiently absorb the radiation energy. Generally, the inorganic working gas is difficult to decompose at high temperature, thus can be used for high temperature cycle; and the organic working gas can't bear high temperature, thus can be used for low temperature cycle.

The process of the power generation cycle is as follows: the working gas absorbs the radiation energy volumetrically in the solar receiver; then the working gas with increased temperature flows into a turbine, doing shaft work through expansion; the turbine drives a generator to generate power through a shaft; and then the expanded working gas flows through the recuperator, transferring heat while the temperature of the working gas is decreased; then the working gas flows into a cooler, a compressor and the recuperator in sequence; and the working gas discharged from the recuperator flows into the solar receiver, absorbing the radiation energy volumetrically in the solar receiver; thereby completing a power generation cycle. The process that the working gas absorbs the radiation energy volumetrically in the solar receiver is mainly a chemical bond absorption process within the molecules, thus the process is fast, efficient and stable. Besides, the temperature of the radiation energy conversion device is increased in the case of the concentrated incident solar radiation. Therefore, some pipelines can be arranged in the cavity of the solar receiver for an auxiliary heat transfer process to transfer the heat on the surface of the radiation energy conversion device to the working gas. In this way, on the one hand, the overall efficiency of the solar receiver is increased, on the other hand, the temperature of the surface of the radiation energy conversion device is decreased, and the thermal stress of the receiver is reduced while the lifetime is extended.

The power generation cycle includes a Brayton cycle or a Rankine cycle. The basic type of the power generation cycle can be a steam power cycle such as the Rankine cycle, where the working medium is water vapor, carbon dioxide, and some organic gases such as butane, butene; and the power generation cycle can be a gas power cycle such as the Brayton cycle, where the working medium is carbon dioxide and so on. The actual power generation cycle may contain processes such as reheating, heat recovery, recompression, partial cooling, intermediate cooling and so on, thus the cycle is relatively complex. Besides, in the solar thermal power generation system, the power generation cycle is generally combined with a heat storage system to improve the stability of power generation, and the heat storage system can use molten salt as a heat storage medium.

The concentrated solar radiation of the solar receiver is provided by one or more of a trough concentrating system, a tower concentrating system, a dish concentrating system or a linear Fresnel concentrating system. In the tower or dish concentrating system, the solar radiation can be directly concentrated into the solar receiver, and the solar receiver and other major components of the power generation apparatus can be placed around the radiation concentrating system which is at a high position, making the power generation apparatus more compact; and it is also feasible to use a secondary-reflection down concentration method, in order to place the components of the power generation apparatus on the ground.

A part of working gas that flows from the solar receiver enters a molten salt heat storage system which can store heat and release heat. Solar radiation has non-uniformity and instability from the aspect of time, the thermal storage system can improve the stability of solar power generation system to output power continuously. When the solar radiation is sufficient, the working gas from the solar receiver has a high temperature, part or all of the working gas can flow through heat exchanger of the molten salt heat storage system, temperature of cold molten salt medium increases after heat exchange, the excess part of the energy of the working gas is stored in the hot molten salt medium. And the working gas flows into the turbine to output work after heat exchanging with molten salt. When the solar radiation is not sufficient, cloudy or rainy weather, temperature of the working gas from the solar receiver is not high enough and can not reach the normal temperature, part or all of the working gas can flow through heat exchanger of the molten salt heat storage system, the temperature of hot molten decreases after heat exchange, thus the stored energy is released during heat exchanging process, and the temperature of working gas is increased and flows into the turbine to output work.

The apparatus realizing the method for solar power generation through the gas volumetric heat absorption as described above is characterized by comprising a cooler, a compressor, a recuperator, a solar receiver, a turbine, a generator and a shaft; and the solar receiver comprises a receiver cavity, a glass window and a radiation energy conversion device, wherein the glass window is embedded in the receiver cavity and the radiation energy conversion device is plated on the surface of the glass window; the cooler, the compressor, the recuperator, the solar receiver and the turbine are connected by pipes in sequence; an outlet of the turbine is connected with a hot side inlet of the recuperator and a hot side outlet of the recuperator is connected with an inlet of the cooler, so that a closed cycle is formed; and the compressor, the turbine and the generator are connected by the same shaft.

The apparatus further comprises molten salt heat storage system, which couples with the power generation cycle; a part of working gas that flows from the solar receiver enters the molten salt heat storage system. The molten salt heat storage system mainly comprises molten salt tank, molten salt pump, heat exchanger, pipe and valve. The molten salt heat storage system may use heat storage system with one tank or heat storage system with two tanks, the heat storage system with one tank is formed by storing hot molten salt and cold molten salt into one tank, nevertheless the heat storage system with two tanks is formed by storing hot molten salt and cold molten salt into one hot tank and one cold tank separately. The heat storage system with two tanks is easy for operate and control, whereas the cost thereof is relatively high.

The radiation energy conversion device is plated on the surface of the glass window with a film plating method, and the glass window is embedded in the receiver cavity and is connected and sealed with the receiver cavity by flanges. The radiation energy conversion device is generally thin, thus can be very firmly and stably fixed on the surface of the glass window with the film plating method. It is difficult to meet the practical application requirements when high-temperature glue is used for connection and sealing, because the thermal expansion coefficients of the glass and the receiver cavity are different, thus the glass is easy to break and can't withstand the internal high temperature and high pressure environment. A proper method is to use the flanges to connect the glass with the receiver cavity, and the glass is embedded in the flange or the receiver cavity, and gaskets are between the glass and the flange or the receiver cavity. In this way, the radiation emitted by the radiation emitter can pass through the glass into the solar receiver, and the high temperature and high pressure environment within the receiver cavity can be safely and stably maintained.

The glass window has a high transmittance for the radiation wave emitted by the radiation emitter and the material of the glass window can be silica, aluminium oxide, and so on. Generally, the material of the glass is selected according to the spectrum of the radiation energy emitted by the radiation emitter, the temperature within the receiver cavity and the pressure within the receiver cavity.

Compared with the prior art, the present application has the advantageous benefits as follows.

1. With the gas volumetric heat absorption method according to the present application, the gas internally and directly absorbs the radiation energy; the heat absorption process is fast, efficient and stable; the working gas can be a plurality of media such as water vapor, carbon dioxide or some organic matters; the amount of heat absorption can be flexibly changed; and thus the method can be easily applied to the occasions for solar energy absorption and power generation.

2. With the gas volumetric heat absorption method according to the present application, the working gas absorbs the radiation energy volumetrically; the heat absorption and heat exchange areas of the solar receiver are significantly reduced and the amount of steel material can be reduced; and the solar receivers have simple structure, high efficiency and low cost.

3. With the radiation energy conversion device which absorbs the solar radiation and emits the radiation wave according to the present application, the need for the heat exchange on the surface of the solar receiver is reduced and the temperature distribution of the surface of receiver can be more uniform; and thus the local thermal stress of the surface of the solar receiver is decreased while the lifetime of receivers is prolonged.

BRIEF DESCRIPTION OF THE DRAWINGS

The drawings here are provided for a further understanding of the present application and constitute a part of the present application, rather than improperly limiting the scope of the present application.

Figure 1:
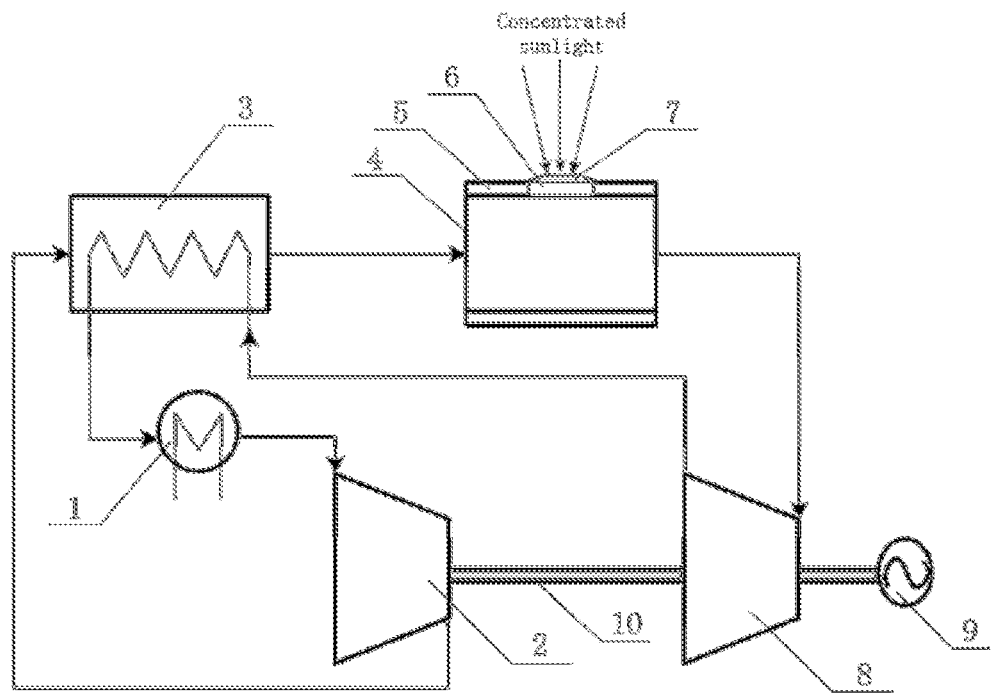
FIG. 1 is a schematic view of an apparatus for solar power generation through gas volumetric heat absorption based on characteristic absorption spectrum.

In the drawings, reference signs are as follows:

cooler 1, compressor 2, recuperator 3, solar receiver 4, receiver cavity 5, glass window 6, radiation energy conversion device 7, turbine 8, generator 9, shaft 10, radiation receiver 11, intermediate layer 12, radiation emitter 13, valve 14, valve 15, heat exchanger 16, carbon dioxide storage tank 17, molten salt cold tank 18, molten salt pump 19, molten salt hot tank 20, molten salt pump 21, heat exchanger 22, valve 23, and valve 24.

DETAILED DESCRIPTION OF ILLUSTRATIVE EMBODIMENTS

The invention will now be described in detail with reference to the drawings and embodiments, wherein the embodiments and descriptions are intended to illustrate the invention rather than limiting the invention.

Embodiment 1

Figure 2:
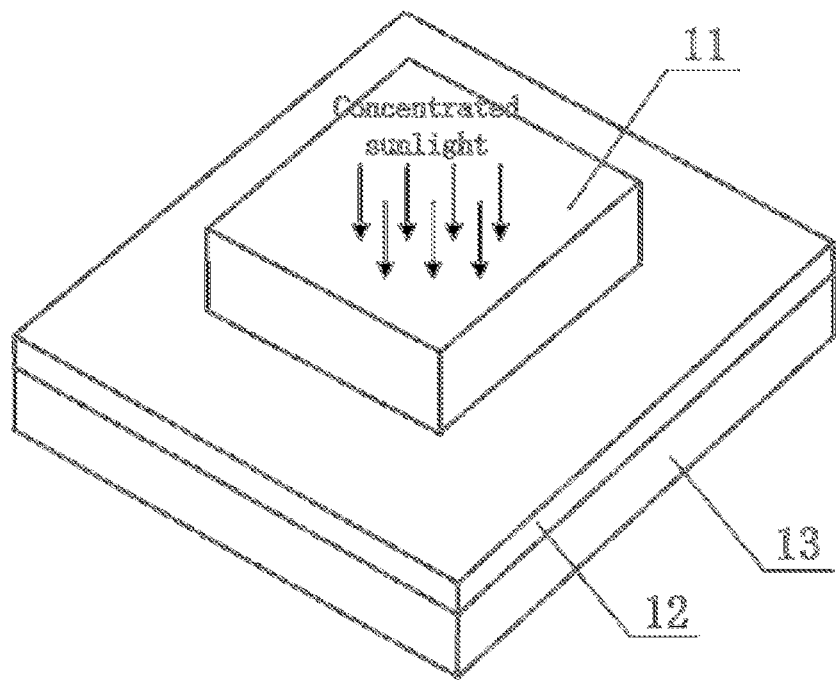
FIG. 2 is a schematic structural view of the radiation energy conversion device illustrated in FIG. 1.

As shown in FIG. 1, an apparatus for solar power generation through gas volumetric heat absorption based on a characteristic absorption spectrum comprises a cooler 1, a compressor 2, a recuperator 3, a solar receiver 4, a turbine 8, a generator 9 and a shaft 10, wherein the solar receiver 4 comprises a receiver cavity 5, a glass window 6 and a radiation energy conversion device 7. The schematic structural view of the radiation energy conversion device 7 is as shown in FIG. 2, and the radiation energy conversion device 7 with a three-layer stacked structure comprises a radiation receiver 11, an intermediate layer 12 and a radiation emitter 13. The radiation energy conversion device 7 is thin and is plated on the surface of the glass window 6 with a film plating method, and the glass window 6 is embedded in the receiver cavity 5 and is connected and sealed with the receiver cavity 5 by flanges. The material of the glass window 6 is silica or aluminium oxide, and the glass window 6 is translucent and can transmit radiation waves emitted by the radiation emitter 13.

The present application provides a method for solar power generation through gas volumetric heat absorption based on a characteristic absorption spectrum; in the practical application, a heat absorbing medium and a working medium for the power generation cycle can be water vapor, carbon dioxide, some organic matters such as hexafluoropropane, butane, butene and so on; a basic cycle type can be a Rankine cycle or a Brayton cycle; the amount of heat absorption can be flexibly changed; thus the method can be easily applied to occasions for solar heat absorption and power generation such as a tower or dish solar power generation system. This embodiment is described in detail, where this embodiment is exemplified by the application of the present application in a solar tower power generation system, both the heat absorbing medium and the working medium for the power generation cycle are carbon dioxide, and a simple regenerative Brayton cycle is used. Next, the heat absorbing area and heat absorbing efficiency of the solar receiver are analyzed and calculated and are compared with that of the current solar receiver which adopts the surface heat absorption method. Further, the power generation efficiency of the system is calculated, and is compared with that of the current solar thermal power generation system.

The solar radiation is concentrated with a secondary-reflection method, where a concentrating ratio is 1000; a heat flux is 600 kW/m$^2$; an inlet aperture area of the solar receiver is 50-100 cm$^2$; and a total heat flow flowing into the receiver is 3-5 kW. When the gas volumetric heat absorption method is used in the solar receiver, the radiation energy conversion device directly absorbs the concentrated solar radiation on one side and emits radiation energy which is distributed in the vicinity of the characteristic absorption peak of the working gas, on the other side. The receiver cavity is filled with carbon dioxide as a working medium, which directly absorbs the radiation energy volumetrically in the receiver cavity, meanwhile, a small amount of heat exchange pipes are arranged in the receiver cavity for an auxiliary heat exchange process. The heat absorbing area of the receiver is larger than the inlet aperture area of the receiver, and the total heat absorbing area of the receiver is estimated to be 1.5-2.0 times of the inlet aperture area. In this way, the total heat exchange surface area of the solar receiver is 100-200 cm$^2$. When the methods of surface heat absorption and dividing-wall-type heat exchange are used in the solar receiver, a large amount of heat exchange pipes are arranged in the receiver, and the heat absorbing medium, namely, the carbon dioxide, flows through in the pipes for heat exchange. The heat exchange coefficient of the carbon dioxide is 0.5-1.5 kW/(m$^2$·K) and the temperature difference between the pipe walls and the working media in the pipes is 50-80° C. In this way, the total heat exchange surface area of the solar receiver is 400-1200 cm$^2$. It can be seen that the total heat exchange surface area can be reduced by 60%-80% when the gas volumetric heat absorption method is used, compared with that of the method of surface heat absorption. Besides, when the methods of surface heat absorption and dividing-wall-type heat transfer are used in the solar receiver, a large amount of heat exchange pipes arranged in the receiver may occupy a larger space of the receiver cavity, the volume of the receiver cavity may be larger, and the pipe design and layout are more complex. The connection among the pipes is generally made by welding. The increase in solder joints further increases the cost of the receiver while the safety and stability of the receiver are decreased. Therefore, the gas volumetric heat absorption method can significantly reduce the heat exchange pipes and save large amounts of steels, thus the receiver has lower cost, simpler structure and longer lifetime.

The concentrated solar radiation is incident on one side surface of the radiation energy conversion device 7 and the radiation emitter 13 on the other side emits radiation waves which are distributed in the vicinity of the characteristic absorption peak of carbon dioxide, wherein the center wavelength of the characteristic absorption peak is 4.2 μm. The spectral line width of the characteristic absorption peak at normal temperature and pressure is about 112 cm$^{-1}$, thus the radiation emitter 13 is to be designed so that the center wavelength of the emitted radiation wave is 4.2 μm, and the spectral line width is less than 112 cm$^{-1}$. In this way, the wavelength of the radiation waves emitted by the radiation energy conversion device 7 ranges from 4.1 μm to 4.3 μm, and the glass window 6 has a transmission rate of 90% to 95% for the radiation waves within this wavelength range. The radiation waves pass through the glass window 6, enter the solar receiver 4, and are absorbed by the carbon dioxide working medium which flows into the receiver. The efficiency of the process from the absorption of the concentrated radiation by the radiation energy conversion device 7 to the emission of the radiation energy mainly depends on the radiation receiver 11 and the radiation emitter 13, and is 80%-85%. The carbon dioxide working medium absorbs the radiation energy which is emitted by the radiation emitter 13 and is distributed in the vicinity of the characteristic absorption peak, to finish the process of heat absorption and temperature increase. This process is a chemical bond absorption process within the carbon dioxide molecules with an efficiency of 85%-90%. The efficiency of the solar receiver which uses the gas volumetric heat absorption method depends mainly on the efficiency of the above two processes, and is 70%-75%, which is 5%-10% higher than that of the current general solar receivers.

The carbon dioxide working medium, which has the temperature and pressure of 465° C. and 20.3 MPa respectively after the heat exchange with the recuperator 3, flows into the solar receiver 4 to absorb the radiation energy emitted by the radiation emitter 13 volumetrically, and the temperature of the carbon dioxide quickly increases to 650° C., with the pressure of 20.0 MPa. Then the carbon dioxide working fluid flows into the turbine 8, doing shaft work through expansion while driving the generator 9 to generate power through the shaft 10; the temperature and pressure of the carbon dioxide after expansion are 516° C. and 6.9 MPa, respectively. The carbon dioxide flows through the recuperator 3 for heat exchange, with the temperature decreased to 75° C. and the pressure of 6.8 MPa. Then the carbon dioxide flows into the cooler 1 and is cooled by cooling water, with the temperature decreased to 35° C. and the pressure of 6.7 MPa. The cooled carbon dioxide flows into the compressor 2 and is compressed to reach a high pressure state, with the temperature and pressure of 65° C. and 20.4 MPa, respectively. In fact, the compression in the compressor 2 is performed at two stages, where the carbon dioxide is compressed firstly and then is compressed once again after intermediate cooling. Then, the carbon dioxide flows through the recuperator 3 for heat exchange, with the temperature of the carbon dioxide increased to 465° C. and the pressure of 20.3 MPa, and then the carbon dioxide flows into the solar receiver 4 to absorb heat. At this point, the carbon dioxide working medium has completed one power generation cycle. This power generation cycle is a simple regenerative Brayton cycle with a power generation efficiency of 48%-50%.

In this embodiment, the solar receiver uses the gas volumetric heat absorption method, with the carbon dioxide as the heat absorbing and cycle working medium, and the cycle is the simple regenerative Brayton cycle. The heat flux entering the solar receiver is 3-5 kW; the efficiency of the solar receiver is 70%-75%, which is 5%-10% higher than that of the current general solar receivers; the actual amount of heat absorption of the carbon dioxide working medium is 2-4 kW. Besides, when the gas volumetric heat absorption method is used in the solar receiver, the total heat exchange surface area of the solar receiver can be reduced by 60%-80%. The power generation efficiency of the cycle is 48%-50%; and the power generation efficiency of the solar thermal power generation system is 33%-38%, which is 10%-15% higher than that of the current solar thermal power generation system which adopts the surface heat absorption method and uses water vapor as the working medium.

Embodiment 2

Figure 3:
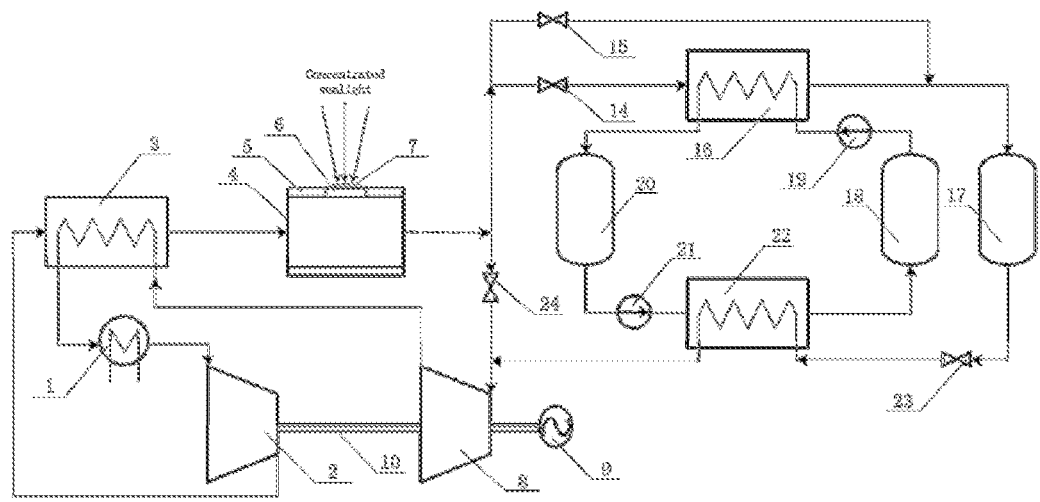
FIG. 3 is a schematic view of a solar power generation system based on gas volumetric heat absorption and molten salt heat storage.

Due to the instability of solar radiation, the solar thermal power generation system needs a heat storage system to ensure the continuity and stability of power generation. As shown in FIG. 3, a solar power generation system based on the gas volumetric heat absorption method and the molten salt heat storage is composed of two parts: a power generation cycle and a molten salt heat storage system. The power generation cycle is a simple regenerative Brayton cycle which is the same as that shown in FIG. 1, comprising a cooler 1, a compressor 2, a recuperator 3, a solar receiver 4, a turbine 8, a generator 9 and a shaft 10, where the solar receiver 4 comprises a receiver cavity 5, a glass window 6 and a radiation energy conversion device 7. The molten salt heat storage system comprises a valve 14, a valve 15, a heat exchanger 16, a carbon dioxide storage tank 17, a molten salt cold tank 18, a molten salt pump 19, a molten salt hot tank 20, a molten salt pump 21, a heat exchanger 22, a valve 23, and a valve 24.

The power generation process of the power generation cycle is the same as that described in Embodiment 1 and isn't to be described again, and this embodiment mainly explains the working process of the molten salt heat storage system. When the solar radiation during the day is sufficient, the solar energy is both for the power generation cycle and a heat storage process. A part of the carbon dioxide working medium with high temperature and high pressure which is discharged from the solar receiver 4 flows through the valve 14, then flows into the heat exchanger 16 for a heat exchange process, with the temperature decreased, and then flows into the carbon dioxide storage tank 17. Molten salt with a relatively low temperature in the molten salt cold tank 18 is pumped into the heat exchanger 16 through the molten salt pump 19 to exchange heat, with the temperature increased, and then flows into the molten salt hot tank 20 to complete the heat storage process. The carbon dioxide working medium in the carbon dioxide storage tank 17 may flow through the valve 23 and the heat exchanger 22 in sequence, converging with another carbon dioxide working medium which is discharged from the solar receiver and flows through the valve 24; and then the carbon dioxide working fluid flows into the turbine 8, doing shaft work through expansion. When the solar radiation is not sufficient, the supercritical carbon dioxide working fluid discharged from the solar receiver 4 flows through the valve 15 and flows into the carbon dioxide storage tank 17; then the carbon dioxide flows through the valve 23 and flows into the heat exchanger 22 for heat exchange, with the temperature increased; then the carbon dioxide flows into the turbine 8, doing shaft work through expansion. The molten salt having a relatively high temperature in the molten salt hot tank 20 is pumped into a hot side inlet of the heat exchanger 22 through the molten salt pump 21 and exchanges heat with the carbon dioxide working medium, with the temperature decreased, and then flows into the molten salt cold tank 18 to complete a process of releasing the stored heat.

Although the present disclosure has been described with reference to one or more examples, workers skilled in the art will recognize that changes may be made in form and detail without departing from the scope of the disclosure and/or the appended claims.

The invention claimed is:

1. A method for solar power generation through gas volumetric heat absorption based on characteristic absorption spectrum, wherein the method comprises:
    absorbing concentrated solar radiation on one side of a radiation energy conversion device and converting solar energy into thermal energy;
    transferring the thermal energy to the other side of the radiation energy conversion device and then converting the thermal energy into radiation energy, which is distributed in a vicinity of a characteristic absorption peak of a working gas; wherein the radiation energy is radiated into a receiver cavity for heat exchange; and flowing the working gas through a recuperator for heat exchange to increase the temperature of the working gas; then flowing the working gas into a solar receiver, absorbing the radiation energy which is emitted from the radiation energy conversion device in the receiver cavity, to further increase the temperature of the working gas; the heated working gas outputting work through expansion in a power generation cycle, wherein the radiation energy conversion device is made of metal or semiconductor and comprises a radiation receiver, an intermediate layer and a radiation emitter, the radiation receiver absorbs the concentrated solar radiation and converts the concentrated solar radiation into thermal energy, and the intermediate layer transfers the thermal energy to the radiation emitter, which emits the radiation energy that is distributed in the vicinity of the characteristic absorption peak of the working gas.

2. The method for solar power generation through gas volumetric heat absorption based on characteristic absorption spectrum according to claim 1, wherein the radiation energy which is distributed in the vicinity of the characteristic absorption peak of the working gas has a same center wavelength as the characteristic absorption peak of the working gas, and has a narrower spectral line width than that of the characteristic absorption peak of the working gas.

3. The method for solar power generation through gas volumetric heat absorption based on characteristic absorption spectrum according to claim 1, wherein the working gas of the solar receiver is selected from the group consisting of carbon dioxide, water vapor, hexafluoropropane, butane and butene.

4. The method for solar power generation through gas volumetric heat absorption based on characteristic absorption spectrum according to claim 1, wherein a process of the power generation cycle comprises:

absorbing the radiation energy volumetrically by the working gas in the solar receiver; then flowing the heated working gas into a turbine, outputting work through expansion; driving a generator with the turbine to generate power through a shaft; and then flowing the expanded working gas through the recuperator for heat exchange; after the temperature of the working gas is decreased, flowing the working gas into a cooler, a compressor and the recuperator in sequence; and flowing the working gas that is discharged from the recuperator into the solar receiver, absorbing the radiation energy volumetrically in the solar receiver, thereby completing the power generation cycle.

5. The method for solar power generation through gas volumetric heat absorption based on characteristic absorption spectrum according to claim 1, wherein the power generation cycle comprises a Brayton cycle or a Rankine cycle.

6. The method for solar power generation through gas volumetric heat absorption based on characteristic absorption spectrum according to claim 1, wherein the concentrated solar radiation of the solar receiver is provided by one or more of a trough concentrating system, a tower concentrating system, a dish concentrating system or a linear Fresnel concentrating system.

7. The method for solar power generation through gas volumetric heat absorption based on characteristic absorption spectrum according to claim 1, wherein a part of the working gas that flows from the solar receiver enters a molten salt heat storage system which can store heat and release heat.

8. An apparatus for solar power generation through gas volumetric heat absorption comprising:

a cooler, a compressor, a recuperator, a solar receiver comprising a receiver cavity, a glass window and a radiation energy conversion device, wherein:

the glass window is embedded in the receiver cavity and the radiation energy conversion device is plated on a surface of the glass window, the radiation energy conversion device is made of metal or semiconductor and comprises a radiation receiver, an intermediate layer and a radiation emitter, the radiation receiver is configured to absorb concentrated solar radiation on one side of the radiation energy conversion device and convert the concentrated solar radiation into thermal energy, the intermediate layer is coupled to transfer the thermal energy to the radiation emitter on another side of the radiation energy conversion device, and the radiation emitter is positioned to emit radiation energy distributed into the receiver cavity in a vicinity of a characteristic absorption peak of a working gas, a turbine, wherein the cooler, the compressor, the recuperator, the solar receiver and the turbine are connected by pipes in sequence for passing the working gas, and wherein an outlet of the turbine is connected with a hot side inlet of the recuperator and a hot side outlet of the recuperator is connected with an inlet of the cooler, so that a closed cycle is formed, a generator; and a shaft, which connects the compressor, the turbine and the generator.

9. The apparatus according to claim 8, wherein the apparatus further comprises a molten salt heat storage system, which couples with the power generation cycle and is arranged so that a part of the working gas that flows from the solar receiver enters the molten salt heat storage system.

10. The apparatus according to claim 8, wherein the radiation energy conversion device is plated on the surface of the glass window with a film plating method, and the glass window is embedded in the receiver cavity.

11. The apparatus according to claim 8, wherein the glass window can transmit a radiation wave that is emitted from the radiation emitter and the material of the glass comprises aluminium oxide.

* * * * *